United States Patent [19]

Novak

[11] 4,004,151
[45] Jan. 18, 1977

[54] DETECTOR FOR DEEP WELL LOGGING

[76] Inventor: William P. Novak, 15180 Lake Ave., Middlefield, Ohio 44062

[22] Filed: May 21, 1975

[21] Appl. No.: 579,402

[52] U.S. Cl. ............................... 250/485; 250/487
[51] Int. Cl.² ............................................ G01J 1/58
[58] Field of Search ............ 250/361, 483, 485, 487

[56] References Cited

UNITED STATES PATENTS

| | | | |
|---|---|---|---|
| 2,853,621 | 9/1958 | Ruderman | 250/483 |
| 2,883,550 | 4/1959 | Ruderman | 250/485 |
| 2,945,955 | 7/1960 | Mossop | 250/361 |
| 3,560,741 | 2/1971 | Strindehag | 250/361 |
| 3,869,614 | 3/1975 | Munk | 250/483 |

*Primary Examiner*—Harold A. Dixon

[57] ABSTRACT

A substantial improvement in the useful life and efficiency of a deep-well scintillation detector is achieved by a unique construction wherein the steel cylinder enclosing the sodium iodide scintillation crystal is provided with a tapered recess to receive a glass window which has a high transmittance at the critical wavelength and, for glass, a high coefficient of thermal expansion. A special high-temperature epoxy adhesive composition is employed to form a relatively thick sealing annulus, which keeps the glass window in the tapered recess and compensates for the differences in coefficients of expansion between the container and glass so as to maintain a hermetic seal as the unit is subjected to a wide range of temperatures.

8 Claims, 2 Drawing Figures

DETECTOR FOR DEEP WELL LOGGING

BACKGROUND OF THE INVENTION

The present invention relates to scintillation detectors for measuring radiation at successive depths in a bore hole and more particularly to an improved type of scintillation detector having a special type of hermetic seal mounting for a high transmittance glass window to increase the efficiency and useful life of the unit.

For many years sodium iodide crystals have been provided in scintillation detectors which are used in the oil industry for deep well logging. The thallium-activated sodium iodide crystal has the ability to detect radioactivity in the geological formations surrounding a bore hole and is used to analyze such formations by being lowered into the bore hole. Temperatures up to 200° C. are encountered in such situations. Before inserting the instrument in the bore hole, some users cool it to temperatures of minus 50° C. or below, so that the instruments are also subjected to unusually low temperatures.

The sodium iodide crystal detects radiation by a scintillation process in which radioactive energy is converted into light energy. The crystal is enclosed in a container and provided with a glass window to allow the light signals to pass from the crystal to a photomultiplier tube or the like where they are converted into electrical signals which can be recorded and analyzed.

One of the major problems with sodium iodide scintillation crystals or other alkali metal halide scintillation crystals is the hydroscopic nature of the material. The absorption of any moisture impairs the efficiency of the crystal and can render it useless. Therefore, it is essential to maintain an effective hermetic seal throughout the temperature range in which the unit is employed.

For more than a decade prior to the present invention the best scintillation detectors for deep well logging have achieved the necessary hermetic seal by a difficult soldering operation using glass windows of a leaded glass composition which could be soldered to produce the strong reliable soldered joints which were needed. Such leaded glasses had poor light transmission characteristics. Plastic seals and other types of seals were heretofore considered unsuitable because it was not known how to provide a reliable impermeable hermetic seal while at the same time providing the needed strength, durability and temperature resistance characteristics.

The soldered construction limited the temperature at which the detectors could be used to about 150° Centigrade and made it impossible to achieve optimum light transmission at a wavelength of 4200 Angstroms because of the poor light transmission characteristics of the leaded glasses. It was not known how to provide a commercially satisfactory detector without soldering the glass.

Prior to the present invention, epoxy resins were not used in scintillation detectors for deep well logging even though the ordinary epoxy adhesive bonds well to glass and steel. Such resins could even break the glass window at high temperatures because their thermal coefficient of expansion is so much higher than that of the glass. Additionally, ordinary epoxy resins do not stand up at temperatures in excess of 100° C. For these reasons the ordinary epoxy resins would be unsuitable for use in deep well scintillation detectors and would not maintain the necessary hermetic seal for an adequate period of time during normal use in deep well logging operations.

SUMMARY OF THE INVENTION

The detector of this invention preferably employs a glass window with a light transmittance of at least 90 percent and preferably at least 95 percent at a wavelength of 4200 Angstroms and with an unusually high coefficient of thermal expansion, preferably at least 0.000008 inch per inch per degree Centigrade and preferably more than twice that of Pyrex glass.

A unique mounting is provided for the glass window which incorporates a relatively thick layer of an epoxy annulus and a tapered arrangement to place and maintain such annulus. The impervious metal container surrounding the metal halide scintillation crystal is provided with a tapered annular recess to receive the glass window and an annular shoulder at the end of the recess for engaging the face of the window. The recess has a tapered surface which gradually decreases in diameter toward the open end of the metal container, and the peripheral surface of the glass window is also tapered so that a relatively thick annular sealing layer of an epoxy adhesive can be formed between the two concentric tapered surfaces. A special high temperature epoxy paste composition is employed between the periphery of the glass window and the internal surface of the annular recess of the metal container to provide a hermetic seal. The composition is applied as a thick paste and may be pressed into place without running or causing unwanted adhesion at the flat face of the window. The epoxy composition when cured has a high resistance to permeation by water vapor, is able to function effectively at temperatures in excess of 200° C., and is preferably tough and slightly flexible to accommodate some deformation during thermal expansion.

An object of the present invention is to provide a rugged durable scintillation detector for deep-well logging which has a much longer useful life than previously known detectors and which can withstand much higher temperatures.

A further object of the invention is to provide an improved window construction for a scintillation detector which greatly improves the efficiency of the unit at the critical wavelengths.

Another object of the invention is to provide an improved scintillation detector which can be manufactured easily at low cost without difficult and expensive soldering operations.

These and other objects, uses and advantages of the invention will become apparent from the following drawings, description and claims.

DESCRIPTION OF THE PREFERRED EMBODIMENT

Figure 1:
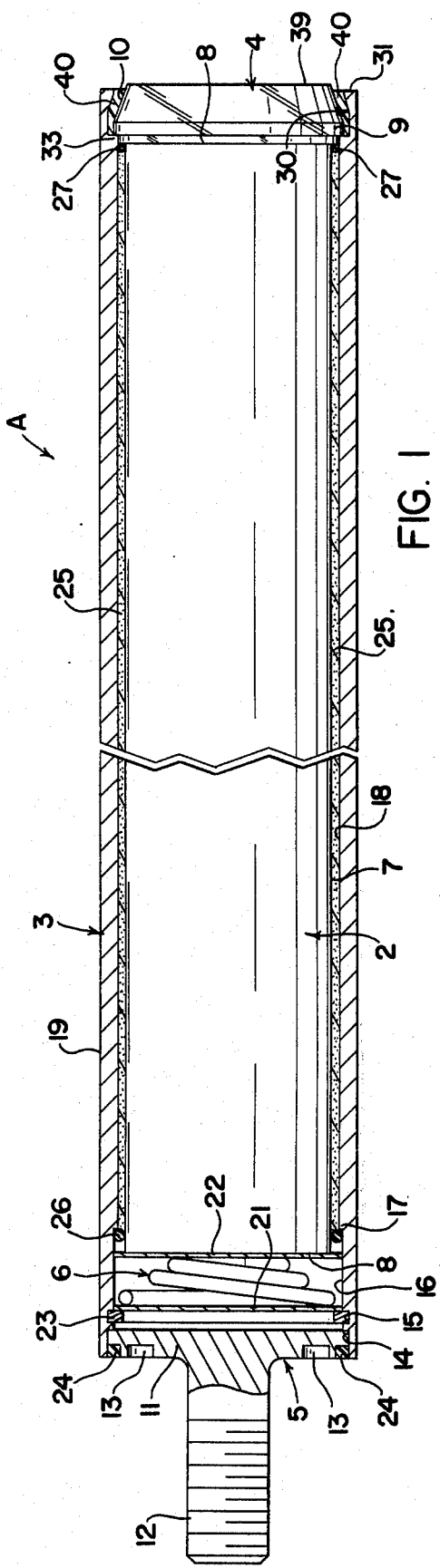
FIG. 1 is a foreshortened longitudinal cross-sectional view showing a cylindrical scintillation detector constructed according to the present invention.

Referring more particularly to the drawings which are drawn substantially to scale to facilitate an understanding of the invention, FIG. 1 shows a scintillation detector A comprising a large one-piece metal-activated alkali metal halide scintillation crystal 2 located in a rigid metal tube or cylinder 3 having a round glass window 4 at one end and a metal end cap 5 at the opposite end. Expansion means 6 in the form of a rugged tapered wire coil spring is provided between the end cap and the scintillation crystal to press the crystal downwardly toward the window 4 and maintain the optical coupling.

The crystal 2 is preferably a high purity thallium activated sodium iodide and may be cut or machined to provide a a smooth cylindrical external surface 7 and flat end faces 8 perpendicular to the axis.

The cylinder 3, the cap 5, the spring 6 and all other metal parts may be made of a corrosion resistant metal and are preferably made of a standard austenitic stainless steel or equivalent. The metal of these parts should have a coefficient of thermal expansion in the range of from about 12 to about 18 times $10^{-6}$ inch per inch per degree centigrade. The metal may, for example, be type 304 or 316 stainless steel with a coefficient of thermal expansion of around 0.000016 inch per inch per degree Centigrade. Titanium alloys and other corrosion resistant metals might also be used but are not, insofar as applicant now knows, available as standard commercial tubing. Plated low carbon steel may also be used. The degree of corrosion resistance should be sufficient to protect against the environment in which the unit is employed.

The window 4 is made of a glass with a high coefficient of expansion, one at least twice that of Pyrex glass, and with a very high light transmittance at the critical wavelengths. It is preferably circular and is preferably provided with a narrow peripheral surface 9 of cylindrical shape and a wider tapered peripheral surface 10 of frusto-conical shape, but satisfactory results may be obtained with somewhat different shapes.

The end cap 5 has a flat circular closure portion 11 and an elongated projecting portion 12 of smaller diameter which is externally threaded to provide means for connecting the scintillation detector A to a larger unit (not shown) which is of a size to be lowered into a deep test bore hole. A plurality of tool-receiving recesses 13 are provided in the cap 5 to facilitate rotation.

As herein shown, the end of the cylinder 3 is machined to provide a first cylindrical counterbore 14 to receive the closure portion 11 and an annular recess 15 spaced from the counterbore. A second cylindrical counterbore 16 extends from said recess to an annular shoulder 17 and is coaxial with the internal and external cylindrical surfaces 18 and 19. A pair of flat circular metal discs 21 and 22 fit in the counterbore 16 and engage the compressed spring 6. A split ring 23 fits in the recess 15 to hold the disc 21 in place. The spring 6 holds the disc 22 against the flat face 8 of the crystal 2 and allows the disc 22 to move axially in response to thermal expansion while maintaining a pressure against the crystal.

A hermetic seal is provided by sealing the end cap 5 in place in the recess 14. As herein shown a ring 24 of epoxy fills an annular recess in the cap 5 and bonds the metal cylinder 3 to the metal cap 5 throughout its circumference, thereby providing an effective hermetic seal.

The scintillation crystal 2 is relatively large and has a length at least several times its diameter. The external diameter of the crystal is slightly less than the internal diameter of the metal cylinder 3 to provide an annular space of narrow cross section. A reflective layer is provided in this space and extends almost the full length of the crystal. As herein shown, the reflective means comprises an annular layer 25 of aluminum oxide powder filling the space between the crystal and the metal cylinder, and a pair of elastic rubber O-rings 26 and 27 surrounding opposite ends of the crystal to center the crystal in the metal cylinder.

The flat end face 8 of the crystal is parallel to and spaced from the flat face 29 of the glass window 4 to provide a space 28 which is filled with a conventional transparent optical coupling material which may be of the type disclosed in U.S. Pat. No. 3,426,195. The optical coupling materials include certain epoxy resins, silicon oils, silicon greases and silicon rubbers as disclosed in said patent.

The spring 6 maintains a pressure on the crystal 2, the optical coupling material at 28 (FIG. 2) and the glass window 4. The O-ring 27 prevents leakage of the coupling material when the latter is in a liquid form. The scintillation detector A may be of conventional construction from the face 29 of the window to the end cap 5.

The end of the metal cylinder 3 is machined or counterbored to provide an annular recess with a reverse taper at the outer end, and the glass window is molded or ground to provide a peripheral surface with a taper similar to that of the recess so that, when the annular space between the window and the surrounding metal cylinder is filled with a cured annular layer of an epoxy resin composition, the layer does not separate from the glass during thermal expansion and contraction.

The tapered annular recess may have a curved cross section, but conical and cylindrical surfaces are easier to machine on the cylinder 3 and form on the window 4. Special optical glass is available commercially which may be used to from the window 4 including Schott La SF1 and Schott UBK7. The La SF1 glass has a transmission of about 96 percent at 4200 Angstroms and a thermal coefficient of expansion of about 0.0000091 inch per inch per degree Centigrade. The UBK7 glass has a transmission of about 98 percent at 4200 Angstroms and a thermal coefficient of expansion of about 0.0000083 inch per inch per degree Centigrade. Other suitable glasses or glass equivalents may be employed. They should have superior transparency at the wavelengths emitted by the crystal, bond well to epoxy, and have a relatively high coefficient of expansion. As herein shown, the cylinder has a tapered annular recess 30 extending from the flat annular end face 31 of the cylinder 3 to the flat annular face 32 of the annular shoulder 33. The recess has a cylindrical surface 34 coaxial with the outer surface 19 of the metal cylinder and a frusto-conical surface 35 coaxial with surface 19 and coaxial with or substantially coaxial with the frusto-conical surface 10 of the glass window. As shown, the flat inner face 29 of the window rests on and engages the flat face 32 of the shoulder 33 throughout the circumference of the shoulder, and the flat outer face 39 of the window is located in a plane parallel to that of face 29 and outwardly of the plane of face 31.

Figure 2:
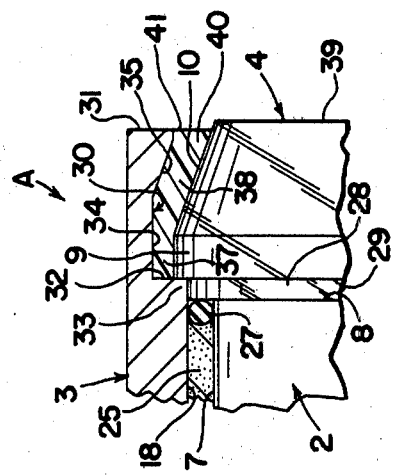
FIG. 2 is an enlarged fragmentary cross-sectional view showing a portion of the scintillation detector on a larger scale.

An annular layer 40 of a special epoxy resin composition is packed into the annular space between the recess 30 and the periphery of the window 3 and cured to provide a continuous solid impervious annular layer filling said space as shown in FIGS. 1 and 2. The annular epoxy layer has a relatively thick tapered portion 38 which terminates near the end face 31 of the cylinder 3 and has a thinner cylindrical portion 37 which extends from portion 38 to the flat face 32.

The epoxy material must be impervious to water and can be rigid or it is preferably tough and capable of slight deformation. A semi-rigid or even a flexible epoxy resin can be used provided it has the required resistance to permeation by water vapor, the necessary heat resistance, and maintains the structural integrity of the unit. The cured epoxy composition forming layer 40 should be resistant to temperatures of 200° Centigrade or higher, should have a linear coefficient of thermal expansion in the range of 0.000045 to 0.000065 inch per inch per degree Centigrade, and should have a very low water vapor permeability, below 0.001 preferably from about 0.0001 to about 0.0005 gram per square foot per hour per inch. It must also adhere to the glass 4 and stainless cylinder 3. Best results can be obtained with a tough epoxy resin composition with high resistance to permeation by water vapor and a high coefficient of expansion.

A suitable high-temperature epoxy adhesive paste is Epoxylite No. 810 made by The Epoxylite Corporation. This is a 100 percent solids system employing a liquid epoxy compound and a dry powder curing agent. When the ingredients are mixed a thick paste is formed which is pressed into the space between the recess 30 and the peripheral surface of the glass window 4. The material gels at room temperature in a short period of time such as 20 minutes or less, depending on the amount of curing agent used or the amount of the accelerator used, if any, and may be post cured by heat for 2 hours or more (for example, 2 hours at 300° F. or 4 hours at 250° F.). The cured adhesive is hard but has fair resistance to impact and vibration. The thermal coefficient of expansion is about 0.000042 inch per inch per degree Centigrade and the water vapor permeability is around 0.0004 gram per square foot per hour per inch.

Because the Epoxylite 810 is applied in the form of a paste, it does not flow readily and does not leak between the face 29 of the glass window and the adjacent face 32 of the metal of the metal cylinder. In the practice of this invention, adhesion between these faces must be avoided since it would break the glass under thermal expansion. For this reason, a free flowing or low viscosity epoxy composition should not be used. It is preferable to employ an epoxy resin composition which when mixed is in the form of a paste or which will gel or thicken to a paste-like consistency and which will adhere well to glass and to metal when applied as such a paste.

Various other epoxy resins which may be used in the practice of the present invention include glycidyl ethers of various bisphenols and including epoxy novolac resins and other epoxy resins formulated to provide suitable high temperature properties. A large number of epoxy resins of a type which can be so formulated are disclosed in "Handbook of Epoxy Resins" by Lee and Neville, Copyright 1967 by McGraw-Hill Book Company, Inc.

Commercial diglycidyl include Epon epoxy resins made by Shell Chemical Company, such as Epon 828; "Epi-Rez" resins made by Jones-Dabney Company, such as Epi-Rez 508,510 or 5108; "Araldite" resins made by Ciba Co., Inc., such as Araldite 6010; or "Bakelite" epoxy resins made by Union Carbide Corp., such as ERL 2774 or the like. Epoxy novolac resins include DER 331, DEN 431 or DEN 438 made by Dow Chemical Co. or Epi-Rez 5155 made by Jones-Dabney Company or a similar type of epoxy novolac.

Epoxy compounds of the type described above may be prepared in various ways, for example, by reacting epichlorohydrin with bisphenol acetone or other bisphenol A, or with a novolac resin having 3 to 6 phenol groups, or with various other polyhydroxy phenols. An epoxy resin with an oxidation-resistant aromatic structure may, for example, be prepared by reacting a phenol-formaldehyde novolac resin with epichlorohydrin to produce an epoxy novolac with a functionality of 3 to 6. For example, an epoxy novolac with a functionality of around 4 can produce excellent cured epoxy layers in the device of this invention.

In order to improve thermal stability and to achieve the desired cross-link density and resistance to water vapor transmission, it is desirable to employ the more highly functional molecules. For example, the diglycidyl ether resins may be blended with a more highly functional epoxy novolac resin or used with a more highly functional aromatic compound. In order to obtain an epoxy resin composition of the desired stability at high temperature, a novolac epoxy resin may be used or a purified bisphenol-based (DGEBA) epoxy resin may be used in combination with an anhydride, phenolic or aromatic amine curing agent. The aromatic amine curing agents include m-phenylenediamine (MPDA) and 4,4'-methylene dianiline (MDA).

Suitable anhydride curing agents include phthalic anhydride and maleic anhydride. Excellent heat resistance can be achieved when using a dianhydride such as cyclopentane dianhydride or pyromellitic dianhydride (PMDA) or a mixture of such dianhydride with an anhydride such as phthalic anhydride (PA) or maleic anhydride (MA). Excellent results are also obtained when using Nadic methyl anhydride (NMA). High temperature resistance can also be achieved in other ways, for example, with imidazole catalysts.

A purified bisphenol-based epoxy resin by itself or mixed with an epoxy novolac resin can, for example, be cured with NMA or PMDA or a mixture of PMDA and MA to produce a cured epoxy with excellent heat stability.

Various means including catalysts and accelerators may be employed to speed up or catalyze the reaction when curing with an anhydride or aromatic amine. The catalytic curing agents include tertiary amines and boron trifluoride amine complexes. The preferred tertiary amines include benzyldimethylamine (BDMA) and tris (dimethylaminomethyl)-phenol (DMP-30). Conventional catalytic complexes may be used, such as $BF_3$ monoethylamine or $BF_3$-DBE.

When employing an anhydride cure, small amounts of the above-mentioned catalytic curing agents may be sufficient. For example, the amount of the DMP-30 or other tertiary amine used with the anhydride or dianhydride may be only 0.5 to 1.5 parts per 100 parts of the DGEBA epoxy resin and the amount of the $BF_3$-MEA complex may be only 1 to 4 parts per 100 parts of said epoxy resin. The amount of the anhydride may be less than about 50 parts per 100 parts by weight of the epoxy resin. Where a mixture of PMDA and MA is employed for curing, it is commonly used, for example, at 0.85 anhydride equivalents per epoxide equivalent.

The procedures employed to form and cure epoxy resin compositions with high heat stability and high resistance to moisture-type transmission are known and conventional.

The type of curing agent required will depend, of course, on the type of epoxy resin being used and its functionality. An epoxy novolac resin with a functionality of 2.5 to 3 or a DGEBA resin will require curing agents which may not be needed for an epoxy novolac resin with a functionality of 4 or more. In some cases the curing system may include minor amounts of an aliphatic polyamine such as diethylene triamine (DETA), triethylene tetramine (TETA), or tetraethylene pentamine (TEPA) or a polyamide, such as Versamid 115 or Versamid 125, but it is usually preferred not to use this type of curing system.

Various additives may be included in the epoxy composition without destroying the essential properties including small amounts of fillers, such as mica. Where an anhydride curing system is employed, it is sometimes desirable to modify the epoxy resin or to employ a small amount of conventional flexibilizer resin to improve toughness and impact resistance even if this tends to decrease the heat stability somewhat.

While it may often be desirable to use special epoxy resins, such as Butarez 15 or special epoxy novolac resins to achieve the desired cross-link density and other properties, it will be apparent to those skilled in the art from this description that the epoxy layer 40 of the scintillation unit A may be made from simple diglycidyl ether-Bisphenol A (DGEBA) resins using appropriate curing systems based, for example, on NMA, PMDA, PMDA-MA or the like or other known curing systems.

The cured annulus 40 should have a high thermal stability so that it can give long service at temperatures of at least 200° C. and preferably at least 250° C. The cured epoxy resin composition of said annulus 40 preferably show a weight loss not in excess of 2 percent and more preferably not in excess of 1 percent when heated 1,000 hours at a temperature of 200° C. and have a deflection temperature (DT) or heat distortion temperature as determined by ASTM Procedure D648–56 in excess of 200° C. and preferably in excess of 300° C.

The epoxy resin compositions used in the practice of this invention bond well to the glass window 4 and the stainless steel cylinder 3 with little or no pressure. They are 100 percent solids systems which cure without releasing water or other condensation by-products.

It is convenient to employ small amounts of curing agents which speed up curing or enable curing to take place at room temperature. Epoxylite 810 is convenient to use at room temperature, but it will be understood that Epoxylite 813-9 or other epoxy resin composition can be used which is cured at an elevated temperature, such as 100° C. to 400° C. Commercial materials can be obtained which can be compounded and cured with heat to provide the layer 40 with good thermal stability at temperatures even in excess of 250° C.

The scintillation detector unit A has been drawn substantially to scale in FIGS. 1 and 2 to facilitate an understanding of the invention, but it will be apparent that the size and proportions vary considerably. The wall thickness of the metal cylinder 3, for example, depends somewhat on the strength of the corrosion-resistant metal, which is preferably a stainless steel. Where the cylinder 3 has a length of 6 to 12 inches and an external diameter of 0.8 inch to 2 inches, the radial wall thickness is no more than 0.2 inch. The cylinder preferably has a length of from about 7 to about 10 inches, a diameter of from about 1 inch to about 1.5 inches, and a wall thickness of from about 0.05 to about 0.1 inch. The axial length of the cylinder is usually 0.1 to 0.2 times its diameter.

The crystal 2 is preferably formed of thallium-activated sodium iodide and machined to provide a solid circular cylinder which occupies 70 to 80 percent of the internal volume of the metal cylinder 3 and which has an axial length of from about 0.8 to about 0.9 times that of the metal cylinder. Other alkali halides may be employed, such as cesium iodide. Means are provided for yieldably mounting the crystal in the metal cylinder, including the spring 6 and the elastic O-rings 26 and 27, so that the crystal floats or moves to accommodate expansion and contraction between −50° C. and +250° C. without damage to the crystal.

The end face 8 of the crystal is preferably spaced from the face 29 of the glass window 4 a distance of 0.02 to 0.3 inch to receive the optical coupling material at 28. A small radial clearance is provided between the external surface 7 of the crystal and the internal cylindrical surface 18 of the cylinder to receive the reflector material at 25. This clearance is from 0.2 to 0.1 inch and more preferably from about 0.03 to about 0.07 inch. The clearance is preferably minimized to obtain maximum effect from a large diameter crystal.

The optical glass window 4 is of a size to close the end of the cylinder 3 and has a thickness from about 0.2 to about 0.3 inch and an external diameter usually in the range of about 0.7 to about 1.5 inch. It preferably has a circular inner end face 29 with a maximum diameter at surface 9 which is up to 10 percent greater than the internal diameter of the cylinder at shoulder 33 and preferably is from about 1 to about 5 percent greater than said internal diameter. The outer peripheral surface of the window is so tapered that the diameter at the end face 39 is from about 0.8 to about 0.9 times the diameter at 9 and preferably less than the diameter of the surface 18. The taper at surface 10 is 15° to 30° and preferably 18° to 25°. The axial length of the taper is preferably from about 0.15 to about 0.25 inch. In a device of the type shown the tapered surface of the window in engagement with the sealing annulus decreases in diameter an amount which is at least half the axial length of the tapered surface and usually no more than said axial length.

The size of the tapered annular recess 30 depends on the size of the glass window 4 and the radial thickness of the cylinder 3. The overall length of the recess is usually from about 0.2 to about 0.3 inch and at least 80 percent of the thickness of the window, preferably less than said thickness. The internal diameter of the cylinder 3 at the end face 31 is at least equal to the maximum external diameter of the glass window and preferably slightly larger so as to provide a radial clearance up to 0.015 inch and preferably from about 0.002 to 0.01 inch.

The taper of the surface 35 of the recess is such that the radial depth of the recess (or the difference in radius from one end of the taper to the other) is from about 0.02 to about 0.05 inch when the axial length of the taper is from 0.08 to 0.02 inch. Said axial length is preferably no greater than 0.15 inch in a unit of the type shown where the taper is in the preferred range. Said taper is preferably about the same as that of the peripheral surface 10 of the window and in the range of 15° to 30° (preferably 18° to 25°). The diameter of the tapered surface of the glass window and the recess 30 preferably increases from about 0.06 to about 0.1 inch per 0.1 inch of axial length.

Because the window 4 shown herein has a diameter greater than the internal diameter of the cylinder 3, the internal diameter at 31 is less than that at 18 and the radial width of the annular surface 32 is greater than the radial depth of the recess relative to the tapered surface 35 as defined above.

At room temperature and above, the annulus of cured epoxy resin at 40 is generally placed under compression because of the described construction.

The unit is assembled so that the spring 6 or other yieldable means maintains appreciable pressure on the optical coupling. As the ambient temperature increases, the crystal 2 expands much more rapidly than the rest of the assembly and thus increases the forces in the longitudinal direction. I believe that there are, therefore, always some compressive forces acting on the annulus at temperatures in excess of room temperatures (about 20° C.).

In the lateral direction, that is, in the plane of the faces of the glass 4, the epoxy annulus expands more rapidly than the container or glass and maintains the hermetic seal. Epoxy resins have higher coefficient of expansion than the steel container and of the glass. The assembly should be thought of as a system with the high expansion characteristics of the epoxy annulus compensating for the lower expansion characteristics of the glass and stainless steel. With the prior art soldered joints, the system had to be carefully matched as to materials and as to fit so that differences in the coefficient of expansion of the various components balanced out over the temperature ranges in which it was used. The epoxy provides superior adhesion and flexibility.

In the unit shown herein, the axial length of annulus 40 is from about 0.2 to about 0.3 inch and sufficient to provide a reliable permanent hermetic seal. The average diameter of the sealing annulus is usually from about 0.8 to about 1.5 inch. The major portion of the annulus has a thickness of from about 0.25 to about 0.5 inch, which thickness may be 0.3 inch or more along at least 1 inch of the length in a device of the type illustrated. The substantial thickness combined with the tapered arrangement enables the annulus 40 to function effectively and to maintain the bond to the glass window and to the metal cylinder indefinitely in spite of expansion and contraction of the unit.

The annulus 40 has an outer surface 41 which preferably extends to or outwardly of the end face 31 when the window 4 projects outwardly as shown in FIG. 2. The surface 41 preferably does not extend beyond the face 39 of the window.

Except for the unique construction in the vicinity of the glass window 4, the recess 30 and the sealing annulus 40, the unit A functions in a conventional manner. Such unit is the same size as conventional scintillation units and is used in conventional scintillation detectors for bore hole logging. The deep well scintillation detectors are well known in the art and have been in use for many years as disclosed, for example, in U.S. Pat. Nos. 3,218,460 and 3,243,588 granted to Scherbatskoy and U.S. Pat. No. 2,956,165 granted to Schlumberger Well Surveying Corp. The unit A can be used, for example, in radiation detectors used by the latter company for oil-well exploration.

Unless the context shown otherwise, the terms used herein are used as normally understood in the art. The term "epoxy resin" refers to a resin having at least two alpha epoxy groups, and the term "epoxy group" means a 1,2-epoxy or alpha epoxy group.

As used herein the term "transparent" refers to a material which is transparent to ultraviolet light, t and, when a sodium iodide crystal is employed, to light with a wavelength which peaks at 4200 Angstroms.

It will be understood that, in accordance with the provisions of the patent statutes, variations and modifications of the specific methods and devices disclosed herein may be made without departing from the spirit of the invention.

Having described my invention, I claim:

1. A hermetically sealed scintillation detector for measuring radiation at successive depths in a bore hole comprising an elongated metal cylinder containing a scintillation crystal of an alkali metal halide, said crystal being coaxial with said cylinder and extending along the length of the cylinder, a round transparent glass window within and closing one end of said cylinder and spaced from the end of said crystal by an optical coupling, said window having a tapered outer surface portion which gradually decreases in diameter in the axial direction away from said crystal, said window having a linear coefficient of thermal expansion which is at least 0.000008 inch per inch per degree Centigrade, the end portion of said cylinder having an inner tapered surface which increases in diameter from the end face of the cylinder toward the crystal with the inside diameter of said end portion being slightly larger than the largest diameter of the window so as to be able to receive said window when the detector is assembled, and a hermetic heat-resistant epoxy resin sealing annulus bonded to and surrounding the sides of said window and bonded to the inner tapered surface of said end portion and filling the space between the sides of said window and the end portion of the cylinder.

2. A scintillation detector according to claim 1 in which said metal cylinder has a length of up to about one foot, a diameter of up to 2 inches and a wall thickness of not in excess of 0.2 inch, said glass window has a thickness of not in excess of 0.3 inch, and said epoxy sealing annulus has a thickness of from about 0.025 to about 0.04 inch and an average diameter of from about 0.8 to about 1.5 inch.

3. A scintillation detector according to claim 1 in which said glass window has a linear coefficient of thermal expansion at 25° C. of from about 0.000008 to about 0.00001 inch per inch per degree Centigrade and a light transmission of at least 90 percent at a wavelength of 4200 Angstroms.

4. In a hermetically sealed scintillation detector of the character described with an elongated hollow metal cylinder which receives a cylindrical scintillation crystal, a round transparent glass window, said cylinder having a counterbore forming an end portion with a tapered recess for receiving said window, said recess decreasing in diameter in the direction away from said crystal and having a minimum diameter no less than the maximum diameter of said window, said window having a tapered peripheral surface portion which also decreases in diameter in said last-named direction, and a relatively thick heat-resistant epoxy sealing annulus bonded to said tapered surfaces and filling the space between said tapered surfaces to provide a hermetic seal, said glass window having a linear coefficient of thermal expansion at 25° C. which is at least 0.000008 inch per inch per degree centigrade and having a light transmission of at least 90 percent at a wavelength of 4200 Angstroms and said epoxy sealing annulus having a weight loss not in excess of 1 percent by weight when heated 1,000 hours at a temperature of 200° C., a water vapor permeability of less than 0.0005 gram per square foot per hour per inch, and a linear coefficient of thermal expansion of from about 0.0001 to about 0.00006 inch per inch per degree Centigrade at 25° C.

5. The combination of claim 4 in which means are provided for applying at temperatures in excess of 20° C. an axial outward pressure on said glass window to maintain said epoxy sealing annulus under compression between the tapered surfaces of said window and said cylinder end portion.

6. The combination of claim 4 in which the tapered surface of said glass window in engagement with said sealing annulus decreases in diameter an amount not in excess of the axial length of said tapered surface and at least about half said axial length and has a taper of from about 18° to about 25°.

7. A hermetically sealed scintillation detector for measuring radiation at successive depths in a bore hole, said detector comprising an elongated hollow metal cylinder containing a scintillation crystal of an alkali metal halide, said crystal being coaxial with said cylinder and extending along the length of the cylinder, a round transparent glass window within and closing one end of said cylinder and spaced from the end of said crystal by an optical coupling, said window having a peripheral surface with an outer diameter greater than the inner diameter of said cylinder where it is co-extensive with the crystal, said window having a frusto-conical portion with a gradual decrease in diameter in the axial direction away from said crystal to a diameter less than said inner diameter of said cylinder, said window having a linear coefficient of thermal expansion which is at least 0.000008 inch per inch per degree Centigrade, a hermetic heat-resistant epoxy resin sealing annulus surrounding said window and filling the space between said window and the end portion of said cylinder, said cylinder end portion being formed with a counter-bore recess to receive said window which provides annular shoulders on said cylinder located at the inner face of said window which engages the circumferential portions of said window face to prevent the window from pressing against the crystal face, said epoxy sealing annulus being bonded to said frusto-conical surface of said window and to the inner surface of the end portion of said cylinder and increasing in thickness in the axial direction away from the crystal.

8. A hermetically sealed scintillation detector for measuring nuclear radiation at successive depths in a bore hole, said detector comprising a stainless steel cylinder with a diameter of from about 1 inch to about 2 inches, a length of from about 6 to about 12 inches, a wall thickness not in excess of 0.2 inch; an elongated thallium-activated sodium iodide crystal within said cylinder and occupying at least 70 percent of the internal volume thereof, said crystal being cylindrical and having a flat end face; a round transparent glass window within and closing one end of said steel cylinder, said window being spaced from the flat end face of said crystal a distance of from about 0.2 to about 0.3 inch and having a thickness of from about 0.2 to about 0.3 inch with a frusto-conical portion away from said crystal, said window being formed of a special glass having a light transmission of at least about 95 percent at a wavelength of 4200 Angstroms and a linear coefficient of thermal expansion of from about 0.000008 to about 0.00001 inch per inch per degree Centigrade; and a heat-resistant epoxy resin sealing annulus bonded to said window throughout the periphery thereof and bonded to the inner surface of the end portion of said steel cylinder to provide a hermetic seal, said sealing annulus having a thickness of from about 0.025 to about 0.04 inch and being formed of a cured epoxy resin composition having a deflection temperature of at least 300° C., a weight loss not in excess of 1 percent by weight when heated 1,000 hours at a temperature of 200° C., and a water vapor permeability less than 0.0005 gram per square foot per hour per inch; the internal diameter at the end portion of said cylinder being almost equal to the maximum external diameter of the glass window with the difference between that internal diameter and the internal diameter nearer to the crystal being from about 0.02 to about 0.05 inches.

* * * * *

UNITED STATES PATENT AND TRADEMARK OFFICE
CERTIFICATE OF CORRECTION

PATENT NO. : 4,004,151
DATED : January 18, 1977
INVENTOR(S) : William P. Novak

It is certified that error appears in the above-identified patent and that said Letters Patent are hereby corrected as shown below:

Claim 8, line 20, change "0.2" to --0.02--

Assignee: Bicron Corporation, Newbury, Ohio

Signed and Sealed this sixteenth Day of August 1977

[SEAL]

Attest:

RUTH C. MASON
Attesting Officer

C. MARSHALL DANN
Commissioner of Patents and Trademarks

UNITED STATES PATENT AND TRADEMARK OFFICE
CERTIFICATE OF CORRECTION

PATENT NO. : 4,004,151
DATED : January 18, 1977
INVENTOR(S) : William P. Novak

It is certified that error appears in the above–identified patent and that said Letters Patent are hereby corrected as shown below:

Claim 8, line 20, change "0.2" to --0.02--

This certificate supersedes Certificate of Correction issued Aug. 16, 1977.

Signed and Sealed this

Tenth Day of January 1978

[SEAL]

Attest:

RUTH C. MASON
Attesting Officer

LUTRELLE F. PARKER
Acting Commissioner of Patents and Trademarks